United States Patent

Soda

[11] Patent Number: 5,764,428
[45] Date of Patent: Jun. 9, 1998

[54] AUDIO SIGNAL REPRODUCING APPARATUS

[75] Inventor: Atsumu Soda, Tokyo, Japan

[73] Assignee: Sony Corporation, Tokyo, Japan

[21] Appl. No.: 758,759

[22] Filed: Dec. 3, 1996

Related U.S. Application Data

[63] Continuation of Ser. No. 387,015, Feb. 10, 1995, abandoned, which is a continuation of Ser. No. 42,767, Apr. 6, 1993, abandoned.

[30] Foreign Application Priority Data

Apr. 8, 1992 [JP] Japan ............... 4-087164

[51] Int. Cl.$^6$ ............... G11B 5/035
[52] U.S. Cl. ............... 360/8; 360/65
[58] Field of Search ............... 360/73.08, 73.11, 360/27, 69, 65, 72.3, 8

[56] References Cited

U.S. PATENT DOCUMENTS

| | | | |
|---|---|---|---|
| 4,442,464 | 4/1984 | Ito | 360/72.1 |
| 5,247,401 | 9/1993 | Umemoto et al. | 360/65 |
| 5,270,875 | 12/1993 | Shah et al. | 360/65 X |
| 5,392,163 | 2/1995 | Higuchi et al. | 360/65 |
| 5,414,568 | 5/1995 | Taki | 360/10.3 X |

FOREIGN PATENT DOCUMENTS

| | | |
|---|---|---|
| 56-25228 | 3/1981 | Japan . |
| 57-172511 | 10/1982 | Japan . |
| 3-247112 | 11/1991 | Japan . |

*Primary Examiner*—Aristotelis M. Psitos
*Assistant Examiner*—James L. Habermehl
*Attorney, Agent, or Firm*—Frommer Lawrence & Haug LLP; William S. Frommer

[57] ABSTRACT

An audio signal reproducing apparatus which can remove, upon variable speed reproduction, only noise such as noise caused by a bias frequency without sacrificing sound is disclosed. An audio signal recorded on a magnetic tape is reproduced by a magnetic head, amplified by an amplifier and supplied to a voltage controlled filter. Meanwhile, the feeding speed of the magnetic tape is detected by a tape speed detector and converted into a corresponding voltage by a tape speed to voltage converter, and the voltage is further converted into a control voltage by a control voltage generation circuit. The control voltage is supplied to the voltage controlled filter so that the cutoff frequency of the filter is varied in accordance with the control voltage. The cutoff frequency decreases as the feeding speed of the magnetic tape decreases. Signals of frequencies of the audio signal inputted to the filter which are lower than the cutoff frequency are maintained while noise components including a signal of a bias frequency are cut by the filter.

5 Claims, 6 Drawing Sheets

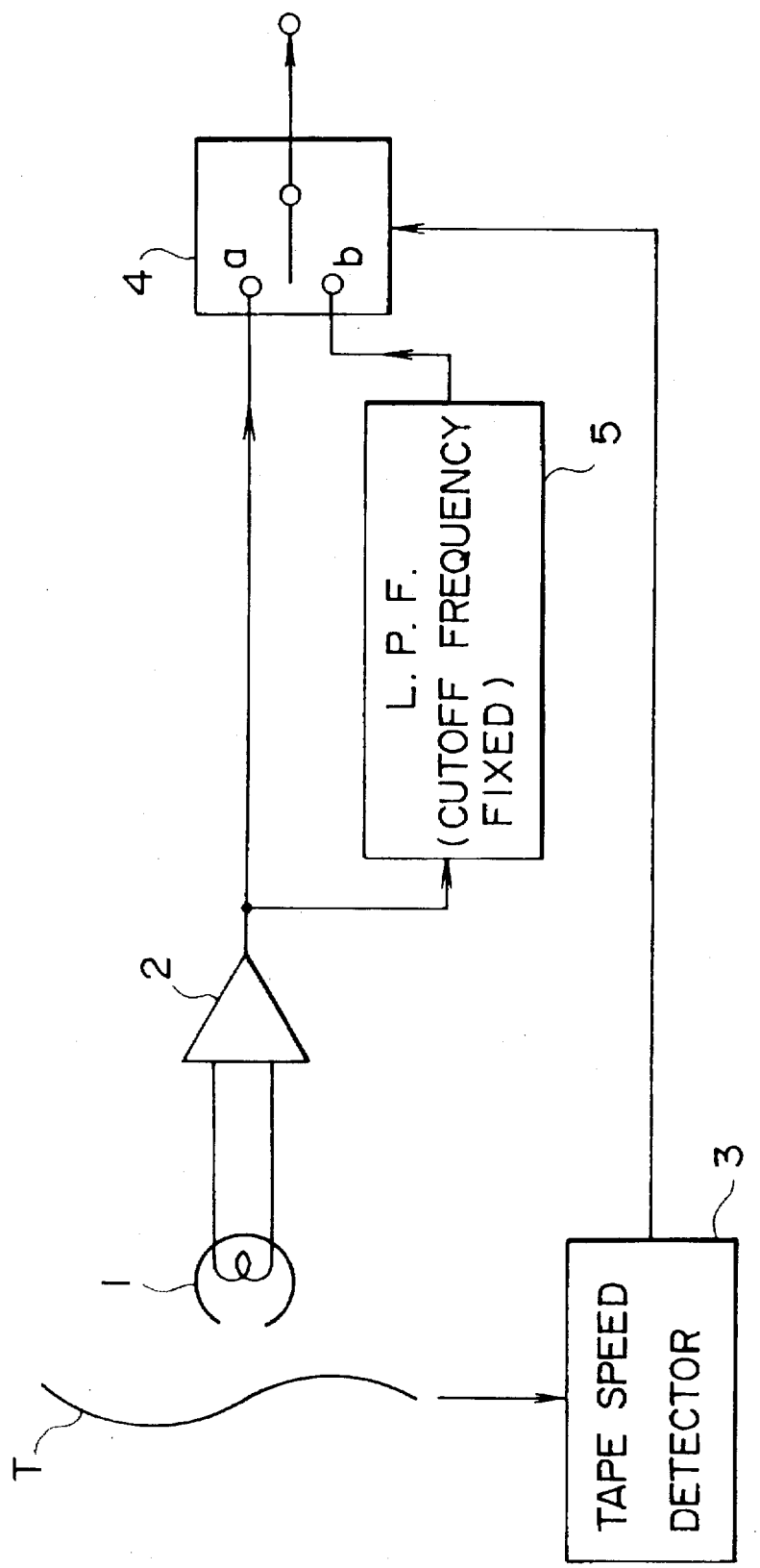

AUDIO SIGNAL REPRODUCING APPARATUS

This application is a continuation of application Ser. No. 08/387,015 filed Feb. 10, 1995 now abandoned, which is a continuation of application Ser. No. 08/042,767 filed Apr. 6, 1993 now abandoned.

BACKGROUND OF THE INVENTION

1. Field of the Invention

This invention relates to an audio signal reproducing apparatus suitable for use with a video tape recorder or a like equipment.

2. Description of the Related Art

A video tape recorder which records an audio signal onto a magnetic tape along a longitudinal direction by ac bias recording conventionally employs such an audio signal reproducing apparatus as shown in FIG. 4. Referring to FIG. 4, in the audio signal reproducing apparatus shown, an audio signal recorded on a magnetic tape T is reproduced by means of a reproduction head 1 and amplified by an amplifier 2. Meanwhile, the feeding speed of the magnetic tape T is detected by means of a tape speed detector 3 which makes use of, for example, a frequency generator (FG) or a like circuit installed in a capstan motor not shown, and in response to the speed information thus detected, a change-over switch 4 is connected to a terminal a side upon normal reproduction. Thus, the audio signal amplified by the amplifier 2 is forwarded to an output processing circuit (not shown) by way of the change-over switch 4.

FIG. 5a illustrates a frequency characteristic of an audio signal upon normal reproduction. As can be seen from FIG. 5a, upon normal reproduction, a bias frequency f3 is sufficiently high comparing with a voice band f1 and an audio frequency upper limit f2, and consequently, even if the bias frequency f3 is outputted, it does not sound as noise.

In contrast, when the audio signal is to be reproduced by slow reproduction as upon edition, since the feeding speed of the magnetic tape T is low, the voice band f1 and the bias frequency f3 are low, and sometimes, the bias frequency f3 becomes lower than the audio frequency upper limit f2 as seen from FIG. 5b. If the audio signal is outputted as it is, then the bias frequency f3 will sound as noise. Therefore, the change-over switch 4 (FIG. 4) is changed, upon slow reproduction, to the other terminal b side so that the bias frequency f3 may be cut by a low-pass filter (LPF) 5. Consequently, even upon slow reproduction, sound free from noise can be outputted.

By the way, in the conventional audio signal reproducing apparatus, normally the cutoff frequency f4 of the low-pass filter 5 is set and fixed so that it may present an optimum characteristic at a particular tape speed. Consequently, in some cases, the bias frequency f3 becomes lower than the cutoff frequency f4 of the low-pass filter 5 as shown in FIG. 6a and is outputted as noise. If the cutoff frequency f4 is set low in order to avoid this, then depending upon the tape speed, it may sometimes occur that part of the voice band f1 is cut as seen from FIG. 6b.

For example, when images recorded by a video tape recorder are to be edited, the editor will in most cases listen to sound reproduced simultaneously with the images and judge contents of the video images. Then, when the editor determines the position of a necessary video image to head the same, slow reproduction is performed, but if the bias frequency f3 is outputted as noise due to such a reason as described above, then this may make the editor feel jarring and make an obstacle to the editing operation. On the contrary if the voice band is cut, then it is difficult to determine the position of an image.

SUMMARY OF THE INVENTION

It is an object of the present invention to provide an audio signal reproducing apparatus which can remove, even upon variable speed reproduction, only noise such as noise caused by a bias frequency without sacrificing sound.

In order to attain the object described above, according to the present invention, there is provided an apparatus for reproducing an audio signal, which comprises a magnetic head for reproducing an audio signal recorded on a magnetic tape, a filter for cutting signal components of the audio signal reproduced by the magnetic head which are higher than a predetermined frequency which varies in accordance with a control voltage, tape speed detecting means for detecting a feeding speed of the magnetic tape, and control voltage generating means for generating the control voltage in response to the feeding speed of the magnetic tape detected by the tape speed detecting means.

In the audio signal reproducing apparatus, an audio signal recorded on a magnetic tape is reproduced by means of the magnetic head and supplied to the filter. Meanwhile, the feeding speed of the magnetic tape is detected by the tape speed detecting means and converted into a corresponding control voltage for controlling the filter by the control voltage generating means. The control voltage is supplied to the filter, and the predetermined frequency, that is, the cutoff frequency, of the filter is varied in accordance with the control voltage. Signals of frequencies of the audio signal inputted to the filter which are higher than the predetermined frequency including a signal of a bias frequency are cut by the filter, and the remaining audio signal is forwarded to an external processing circuit.

Thus, with the audio signal reproducing apparatus, since the characteristic of the filter can be varied in response to the feeding speed of a magnetic tape, the predetermined frequency, that is, the cutoff frequency, of the filter can be set such that, for example, upon variable speed reproduction such as slow reproduction, it may be an intermediate frequency between the audio range frequency and the bias frequency. Consequently, even upon slow reproduction of the audio signal reproducing apparatus, only noise components such as a noise component caused by the bias frequency can be removed without sacrificing a voice band.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a block diagram showing a conventional audio signal reproducing apparatus;

DETAILED DESCRIPTION OF THE PREFERRED EMBODIMENT

Figure 1:
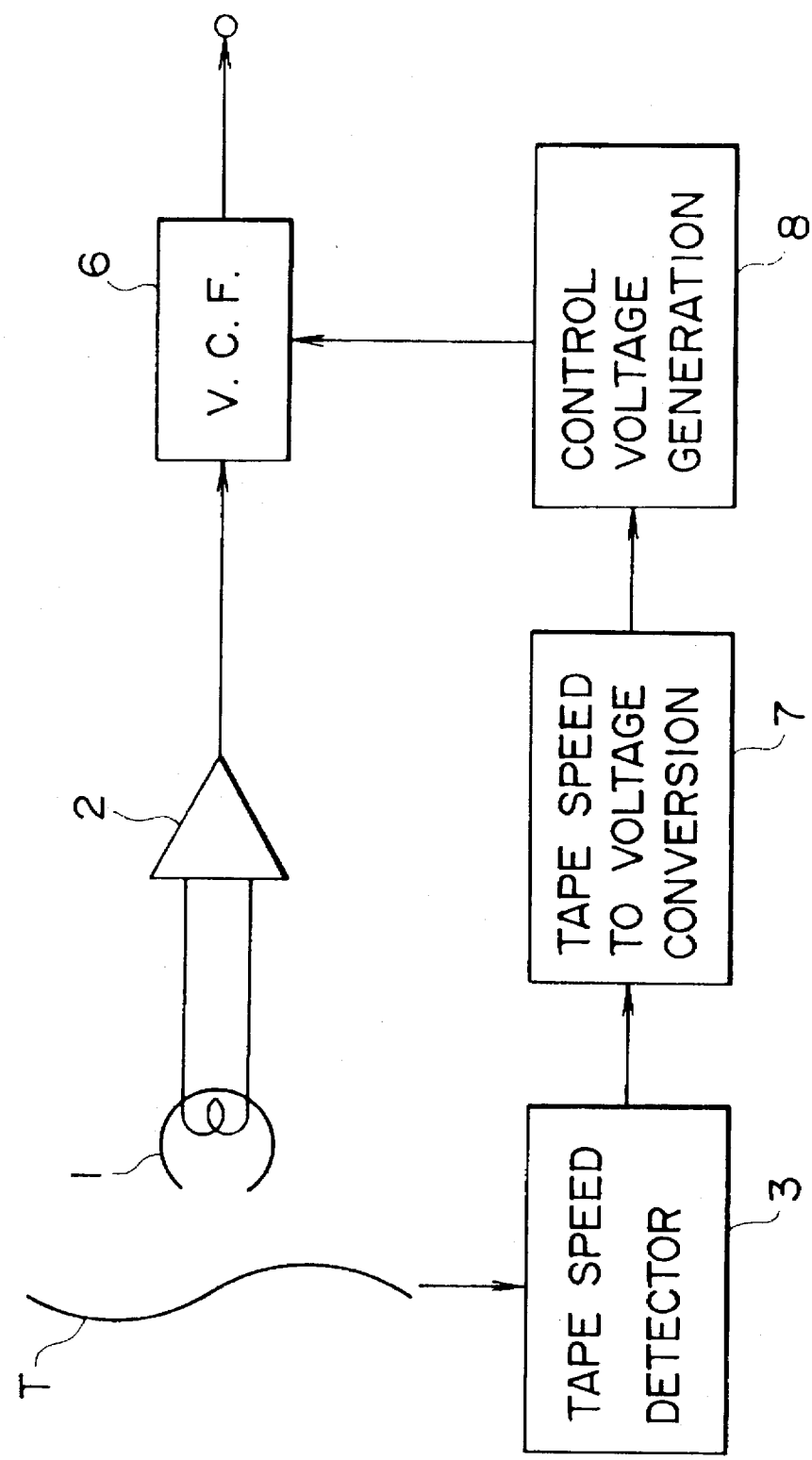
FIG. 1 is a block diagram of an audio signal reproducing apparatus showing a preferred embodiment of the present invention.

Referring to FIG. 1, there is shown general construction of an audio signal reproducing apparatus to which the present invention is applied. An audio signal recorded on a magnetic tape T is reproduced by means of a reproduction head 1, amplified by an amplifier 2 and supplied to a voltage controlled filter (VCF) 6.

Figure 2:
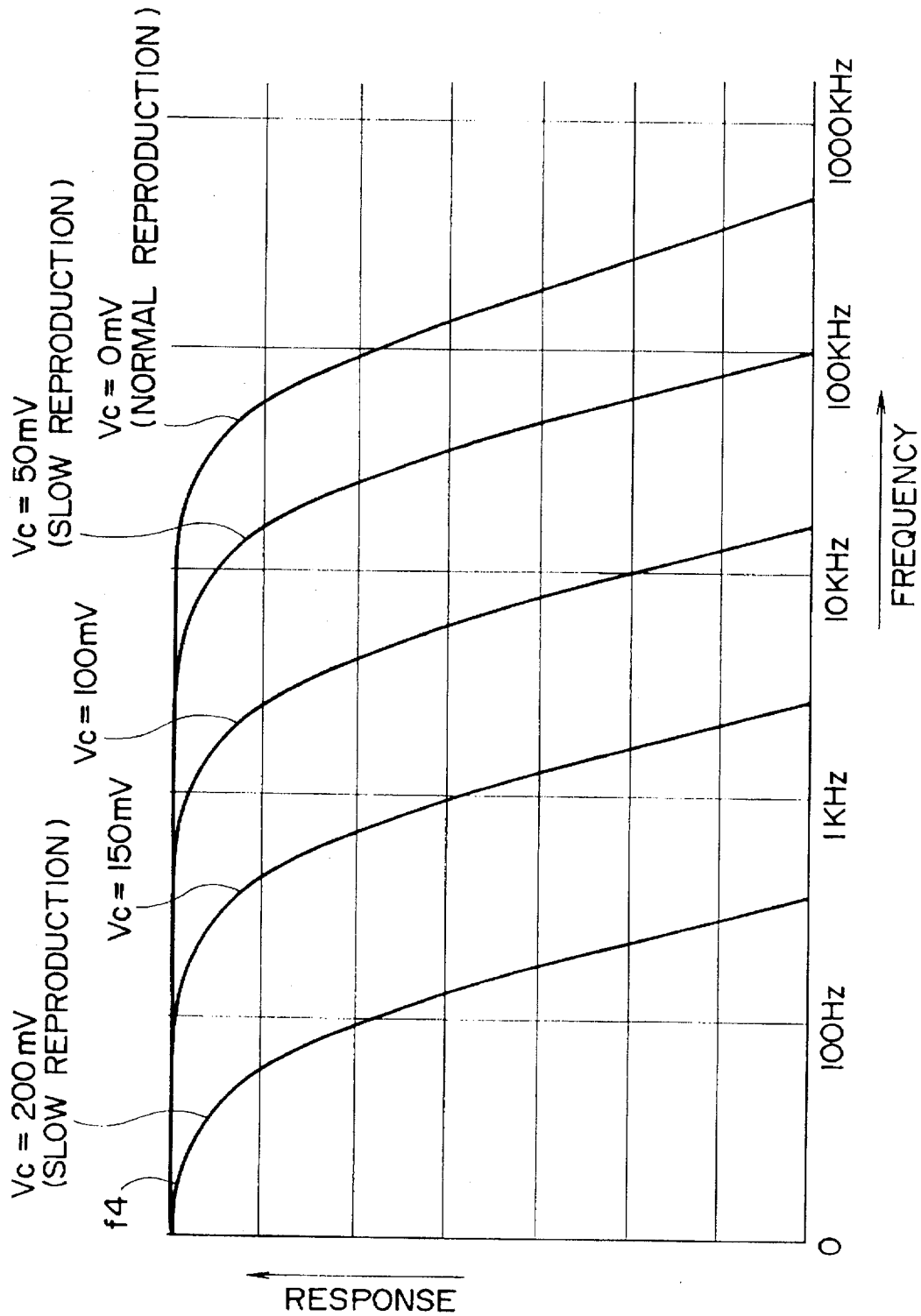
FIG. 2 is a diagram illustrating a relationship between a control voltage and a cutoff frequency of a voltage controlled filter.

The voltage controlled filter 6 is constructed such that the cutoff frequency f4 thereof varies in accordance with a control voltage VC supplied thereto as seen from FIG. 2. In the present audio signal reproducing apparatus, the control voltage VC is 0 mV upon normal reproduction and increases in reverse proportion to the tape speed upon slow reproduction so that the cutoff frequency f4 of the voltage controlled filter 6 may be dropped.

Referring back to FIG. 1, the feeding speed of the magnetic tape T is detected by means of a tape speed detector 3 which makes use of a frequency generator (FG) built in a capstan motor (not shown) of the video tape recorder. The feeding speed thus detected is supplied to a tape speed to voltage converter 7, at which it is converted into a corresponding voltage. The voltage is converted into the control voltage VC for driving the voltage controlled filter 6 by a control voltage generation circuit 8, and the control voltage VC thus produced is supplied to the voltage controlled filter 6. In the present audio signal reproducing apparatus, the control voltage VC is set so that it increases as the feeding speed of the magnetic tape T decreases upon slow reproduction. Thus, signals having frequencies higher than the cutoff frequency f4 of the audio signal inputted to the voltage controlled filter 6 are cut by the voltage controlled filter 6, and the remaining audio signal is forwarded to an external output processing circuit (not shown).

Figure 3A:
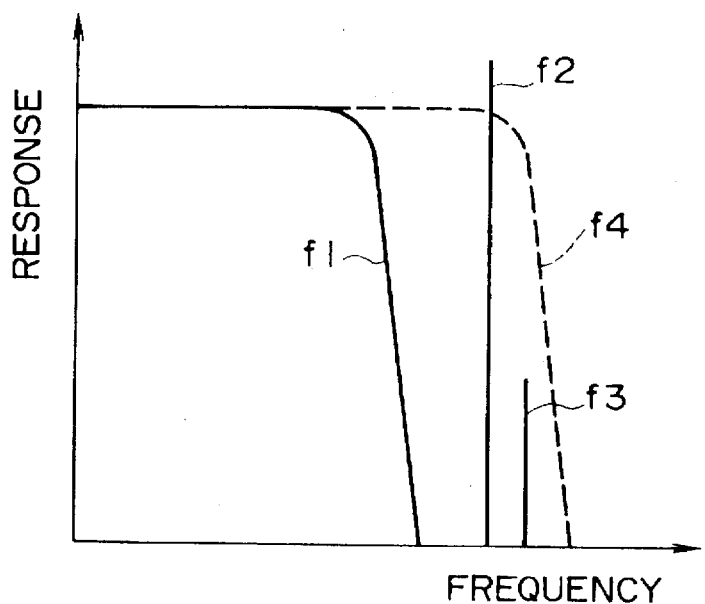
FIGS. 3a and 3b are diagrams illustrating setting of a cutoff frequency of a voltage controlled filter.
Figure 3B:
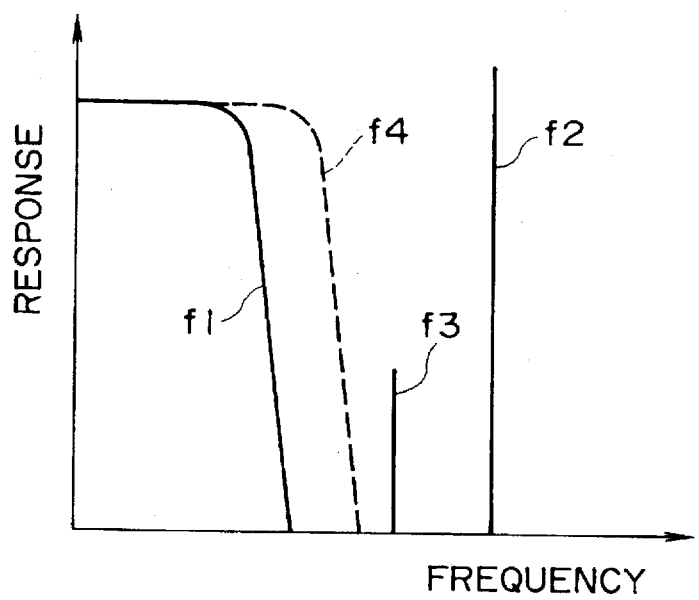
Figure 5A:
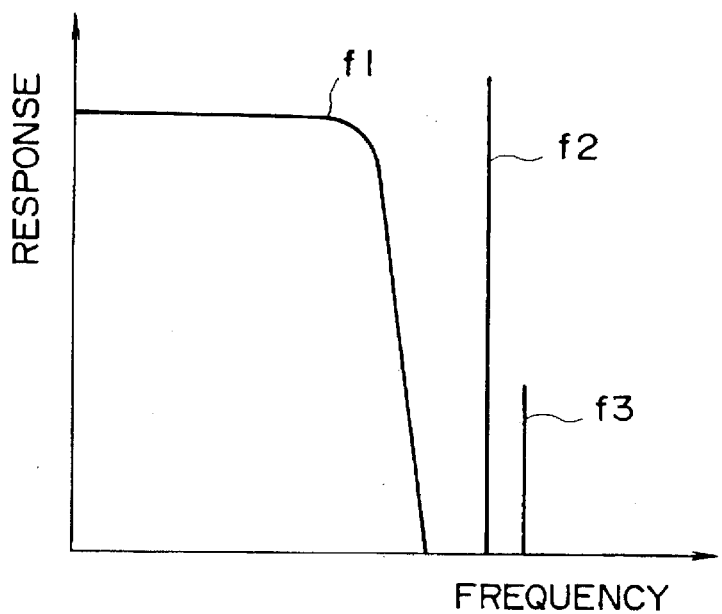
FIGS. 5a and 5b are diagrams illustrating a frequency characteristic of an audio signal.
Figure 5B:
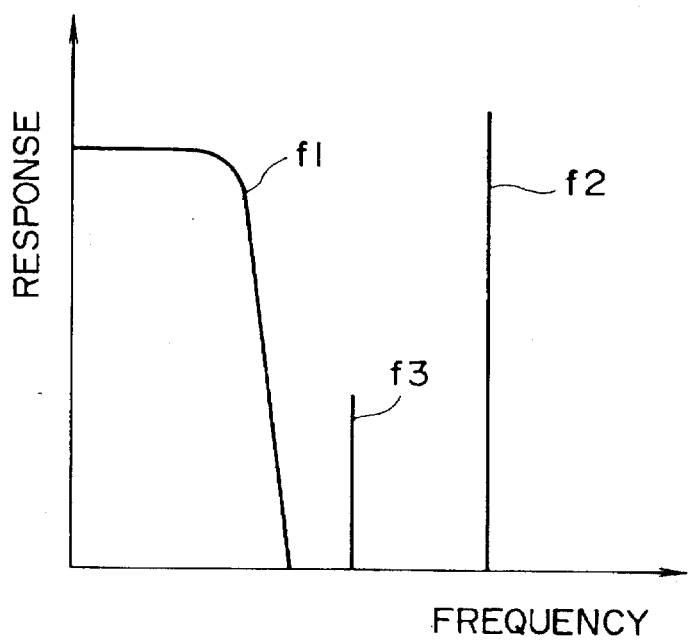
Figure 6A:
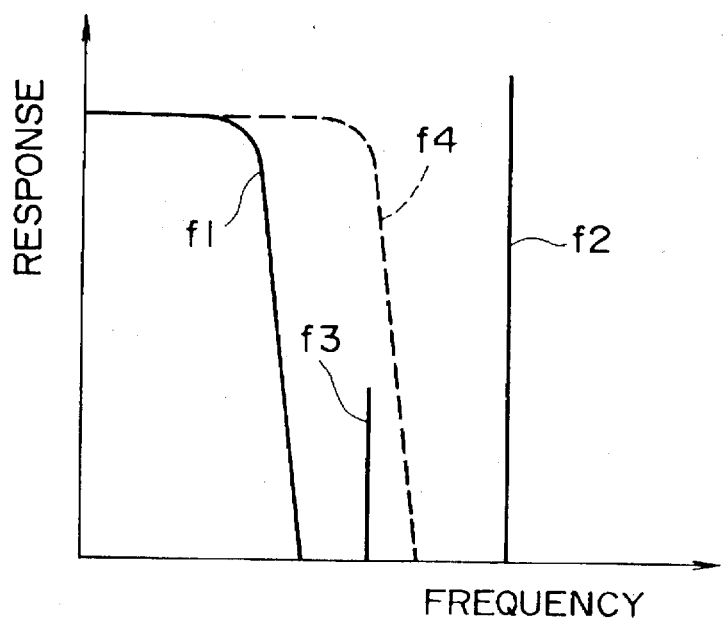
FIGS. 6a and 6b are diagrams illustrating an example of setting of a cutoff frequency of a low-pass filter upon slow reproduction.
Figure 6B:
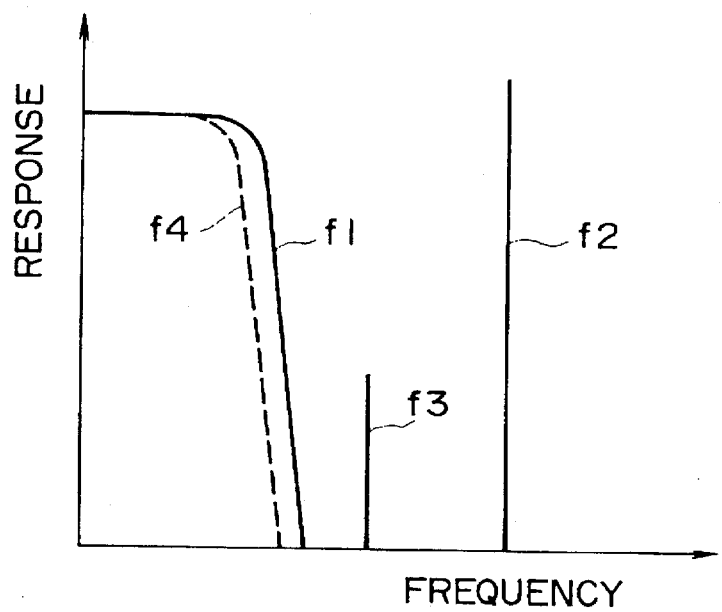

In the present audio signal reproducing apparatus, the cutoff frequency f4 of the voltage controlled filter 6 is set such that, upon normal reproduction, it is higher than the voice band f1 as seen from FIG. 3a. Consequently, the reproduced sound is outputted fully. On the other hand, when slow reproduction is performed so as to effect, for example, heading of an image upon edition, the voice band f1 and the bias frequency f3 drop as seen from FIG. 3b. In this instance, the feeding speed of the magnetic tape T drops and the control voltage VC becomes higher, and consequently, the cutoff frequency f4 of the voltage controlled filter 6 drops.

Here, the cutoff frequency f4 is set such that, when the feeding speed of the magnetic tape T upon slow reproduction varies, it has a middle value between the cutoff frequency f4 and the voice band f1 at the current tape feeding speed. Consequently, even when slow reproduction is performed varying the feeding speed of the magnetic tape T, only noise components of the bias frequency f3 and so forth can be removed without sacrificing the voice band f1.

Having now fully described the invention, it will be apparent to one of ordinary skill in the art that many changes and modifications can be made thereto without departing from the spirit and scope of the invention as set forth herein.

What is claimed is:

1. An apparatus for reproducing an audio signal, said apparatus comprising:

a magnetic head for reproducing an audio signal recorded on a magnetic tape, said magnetic tape being fed at one of a plurality of speeds including a normal playback reproduction speed and a plurality of slow speeds each slower than said normal playback reproduction speed;

tape speed detecting means for detecting the speed of the magnetic tape;

control voltage generating means for generating a control voltage signal which corresponds to the detected speed of the magnetic tape detected by said tape speed detecting means; and an analog voltage controlled filter having an upper cutoff frequency responsive to said control voltage signal so that said upper cutoff frequency varies in accordance with the detected speed of the magnetic tape such that the upper cutoff frequency has a first value when the detected speed of said magnetic tape is said normal playback reproduction speed and the upper cutoff frequency has one of a plurality of second values each lower than said first value when the detected speed of said magnetic tape is one of the slow speeds, said filter removing signal components in the reproduced audio signal having respective frequencies which are higher than said upper cutoff frequency.

2. An apparatus for reproducing an audio signal recorded on a magnetic tape, said magnetic tape being fed at one of a plurality of feed rates including a normal playback reproduction feed rate and a plurality of slow reproduction feed rates each slower than said normal playback reproduction feed rate, said apparatus comprising:

a magnetic head for reproducing the recorded audio signal which includes a voice band portion having an upper frequency and which may include a noise component having a relatively high frequency, the upper frequency of said voice band portion and the frequency of said noise component vary due to the feed rate of said magnetic tape;

tape speed detecting means for detecting the rate at which said magnetic tape is being fed;

control voltage generating means for generating a control voltage signal which corresponds to the rate of said magnetic tape detected by said tape speed detecting means; and an analog voltage controlled filter having an upper cutoff frequency responsive to said control voltage signal so that the upper cutoff frequency varies in accordance with the detected rate of said magnetic tape such that the upper cutoff frequency has a first value when the detected rate of said magnetic tape is said normal playback reproduction feed rate and the upper cutoff frequency has one of a plurality of second values each lower than said first value when the detected rate of said magnetic tape is one of said slow reproduction feed rates, the respective one of said second values of the upper cutoff frequency being lower than the frequency of said noise component and higher than the upper frequency of said voice band portion when said magnetic tape is fed at the corresponding one of said slow reproduction feed rates, said filter removing said noise component from the reproduced audio signal without removing said voice band portion when said magnetic tape is fed at any of said slow reproduction feed rates.

3. An apparatus for reproducing an audio signal according to claim 2, wherein the frequency of said noise component is higher than an audio frequency upper limit when said magnetic tape is fed at said normal playback reproduction feed rate.

4. An apparatus for reproducing an audio signal according to claim 3, wherein said first value of the upper cutoff frequency of said filter is higher than the upper frequency of said voice band portion when said magnetic tape is fed at said normal playback reproduction feed rate.

5. An apparatus for reproducing an audio signal according to claim 3, wherein said first value of the upper cutoff frequency of said filter is higher than said audio frequency upper limit when said magnetic tape is fed at said normal playback reproduction feed rate.

* * * * *